(12) United States Patent
Puttaiah et al.

(10) Patent No.: US 7,294,431 B2
(45) Date of Patent: Nov. 13, 2007

(54) BATTERY EMPLOYING THERMALLY CONDUCTIVE POLYMER CASE

(75) Inventors: Rajeev Puttaiah, Troy, MI (US); John Smaga, Franklin, MI (US); Ronald Himmler, Sterling Heights, MI (US); Lin R. Higley, Troy, MI (US); Marshall D. Muller, Farmington Hills, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 295 days.

(21) Appl. No.: 10/824,062

(22) Filed: Apr. 14, 2004

(65) Prior Publication Data

US 2005/0233206 A1  Oct. 20, 2005

(51) Int. Cl.
*H01M 2/00* (2006.01)
(52) U.S. Cl. .............................. 429/163; 429/167
(58) Field of Classification Search ............... 429/163, 429/167; 220/586, 577, 592.09
See application file for complete search history.

(56) References Cited

U.S. PATENT DOCUMENTS

| | | | |
|---|---|---|---|
| 3,584,758 A * | 6/1971 | Moore et al. ............... | 220/507 |
| 6,602,637 B1 * | 8/2003 | Kurasawa et al. .......... | 429/176 |
| 6,713,088 B2 * | 3/2004 | Lodyga et al. .............. | 424/489 |

\* cited by examiner

*Primary Examiner*—Patrick Joseph Ryan
*Assistant Examiner*—Ben Lewis
(74) *Attorney, Agent, or Firm*—David W. Schumaker

(57) ABSTRACT

A battery having at least one group of electric power-generating elements each comprising at least a positive electrode, a negative electrode and a separator; and a battery case containing the group of electric power-generating elements. The battery case is formed from a mixture which includes a matrix material selected from the group consisting of plastics, polymers, resins or combinations thereof. The mixture further includes a thermally conductive, electrically insulating material distributed throughout the matrix material. The thermally conductive material has a thermal conductivity at least one order of magnitude higher than the thermal conductivity of the matrix material. The present invention also includes battery cases (lids and containers) used in making the batteries and formed of the mixture.

16 Claims, 5 Drawing Sheets

BATTERY EMPLOYING THERMALLY CONDUCTIVE POLYMER CASE

FIELD OF THE INVENTION

The present invention relates generally to electrochemical cells or batteries and more specifically to alkaline batteries. In particular the present invention pertains to alkaline batteries having plastic cases formed from blended polymer materials with enhanced thermal conductivity.

BACKGROUND OF THE INVENTION

Rechargeable batteries are used in a variety of industrial and commercial applications such as fork lifts, golf carts, uninterruptable power supplies, and electric vehicles. Rechargeable lead-acid batteries are a useful power source for starter motors for internal combustion engines. However, their low energy density (about 30 Wh/kg) and their inability to reject heat adequately, makes them an impractical power source for an electric vehicles (EV), hybrid electric vehicles (HEV) and 2-3 wheel scooters/motorcycles. Electric vehicles using lead-acid batteries have a short range before requiring recharge, require about 6 to 12 hours to recharge and contain toxic materials. In addition, electric vehicles using lead-acid batteries have sluggish acceleration, poor tolerance to deep discharge, and a battery lifetime of only about 20,000 miles.

Nickel-metal hydride batteries ("Ni—MH batteries") are far superior to lead-acid batteries, and Ni—MH batteries are the ideal battery available for electric vehicles, hybrid vehicles and other forms of vehicular propulsion. For example, Ni—MH batteries, such as those described in U.S. Pat. No. 5,277,999, the disclosure of which is incorporated herein by reference, have a much higher energy density than lead-acid batteries, can power an electric vehicle over 250 miles before requiring recharge, can be recharged in 15 minutes, and contain no toxic materials.

Extensive research has been conducted in the past into improving the electrochemical aspects of the power and charge capacity of Ni—MH batteries, which is discussed in detail in U.S. Pat. Nos. 5,096,667, 5,104,617, 5,238,756 and 5,277,999, the contents of which are all incorporated by reference herein.

Until recently the mechanical and thermal aspects of the performance of Ni—MH batteries have been neglected. For example, in electric vehicles and in hybrid vehicles, the weight of the batteries is a significant factor. For this reason, reducing the weight of individual batteries is a significant consideration in designing batteries for electric and hybrid vehicles. Battery weight should be reduced while still affording the necessary mechanical requirements of the battery (i.e. ease of transport, ruggedness, structural integrity, etc.).

Electric vehicle and hybrid vehicle applications introduce a critical requirement for thermal management. Individual electrochemical cells are placed together in close proximity and many cells are electrically coupled together. Therefore, since there is an inherent tendency to generate significant heat during charge and discharge, a workable battery design for electric and hybrid vehicles is judged by whether or not the generated heat is sufficiently controlled. Sources of heat are primarily threefold. First, ambient heat due to the operation of the vehicle in hot climates. Second, resistive or $I^2R$ heating on charge and discharge, where I represents the current flowing into or out of the battery and R is the resistance of the battery. Third, a tremendous amount of heat is generated during overcharge due to gas recombination.

In the past, Ni—MH batteries employed metal battery cases made of such materials as aluminum, nickel and stainless steel. These cases provided the batteries with an efficient path for removal of internal heat via the excellent thermal conductivity of these metals. Therefore, it was not very difficult to provide the batteries and modules (bundles) of such batteries with effective thermal cooling even when only a portion of the case was exposed to the cooling medium.

Today, in an effort to reduce the weight of such batteries (particularly in vehicle applications), the cases for these types of batteries (and modules) are made of plastic. The specific plastics and/or blends/alloys that have been used up to now are chosen for their physical properties, dielectric properties and chemical resistance to the environment and the electrochemical cells internal chemistry. Unfortunately, these plastics generally have relatively low thermal conductivity, and as such their use generally places severe limitations on the ability of the batteries to be cooled efficiently, and therefore more elaborate systems are needed to provide both the structural integrity and thermal management of the batteries.

What is needed in the art is batteries made with lightweight cases that are formed from lightweight plastic blends that have the mechanical, dielectric and chemical resistance properties required for such battery cases and additionally have enhanced thermal conductivity. These batteries will make it easier to thermally manage the batteries, battery modules and battery packs (via cooling with gas and/or liquids coolants) by providing for ease and uniformity of cooling and flexibility of cooling design options.

SUMMARY OF THE INVENTION

The present invention includes a battery having at least one group of electric power-generating elements each comprising at least a positive electrode, a negative electrode and a separator; and a battery case containing the group of electric power-generating elements. The battery case is formed from a mixture which includes a matrix material selected from the group consisting of plastics, polymers, resins or combinations thereof. The mixture further includes a thermally conductive, electrically insulating material distributed throughout the matrix material. The thermally conductive material has a thermal conductivity at least one order of magnitude higher than the thermal conductivity of the matrix material. The present invention also includes battery cases (lids and containers) used in making the batteries and formed of the mixture.

The polymer matrix material may be at least one polymer selected from the group consisting of polycarbonate, polyethylene, polypropylene, acrylics, vinyls, fluorocarbons, polyamides, polyolefin. polyesters, polyphenylene sulfide, polyphenylene ether, polyphenylene oxide, polystyrene, acrylonitrile-butadiene-styrene, liquid crystal polymers and combinations, mixtures, alloys or copolymers thereof. Particularly preferred are a polyphenylene ether/polystyrene blend and a polypropylene/polyphenylene ether blend.

The thermally conductive, electrically insulating material may be distributed within the matrix material in a continuous (i.e. two or three dimensional meshes or mattes), discontinuous (i.e. particulate or fibrous material) or mixed mode manner. Examples of suitable thermally conductive, electrically insulating material include calcium oxide, titanium oxide, silicon oxide, zinc oxide, silicon nitride, aluminum nitride, and boron nitride and mixtures thereof. Particularly preferred is particulate boron nitride.

DETAILED DESCRIPTION OF THE INVENTION

Figure 1:
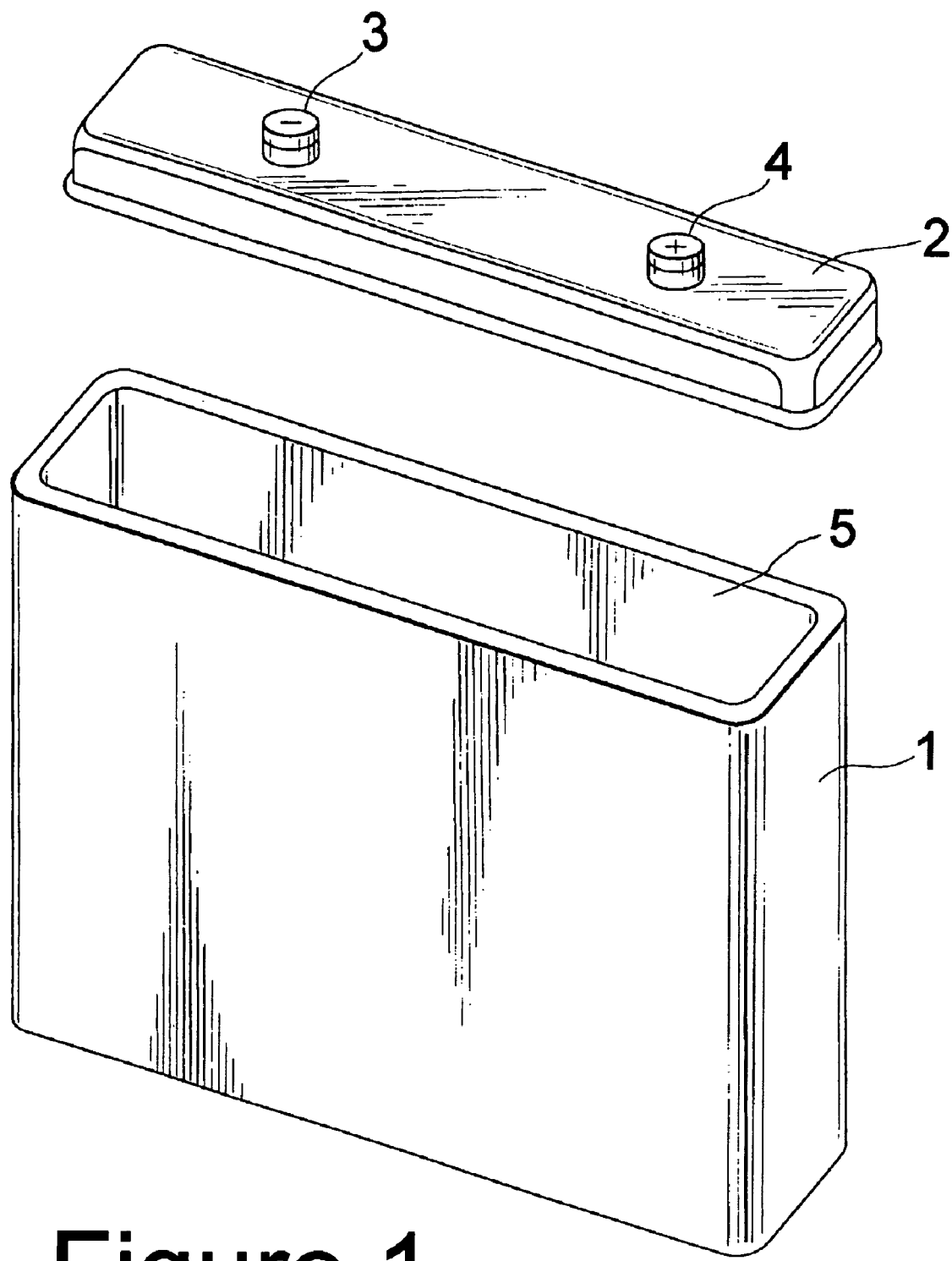
FIG. 1 is a schematic illustration of an example of a secondary battery case according to one embodiment of the present invention.

The present invention includes battery cases formed from a polymeric material which has enhanced thermal conductivity and batteries which include such cases. Schematic illustrations of examples of secondary batteries and their cases embodying the present invention are shown in FIGS. 1 to 5, however, the present invention is not limited to these embodiments. FIG. 1 illustrates a battery case of the present invention comprising a container 1 and a lid 2 which are formed from the enhanced thermal conductivity polymeric material. The lid 2 is provided with a negative electrode terminal 3 and a positive electrode terminal 4. The container 1 and the lid 2 are welded by fusion or melt bonding with heat or other means such as vibration or sonic welding.

Figure 2:
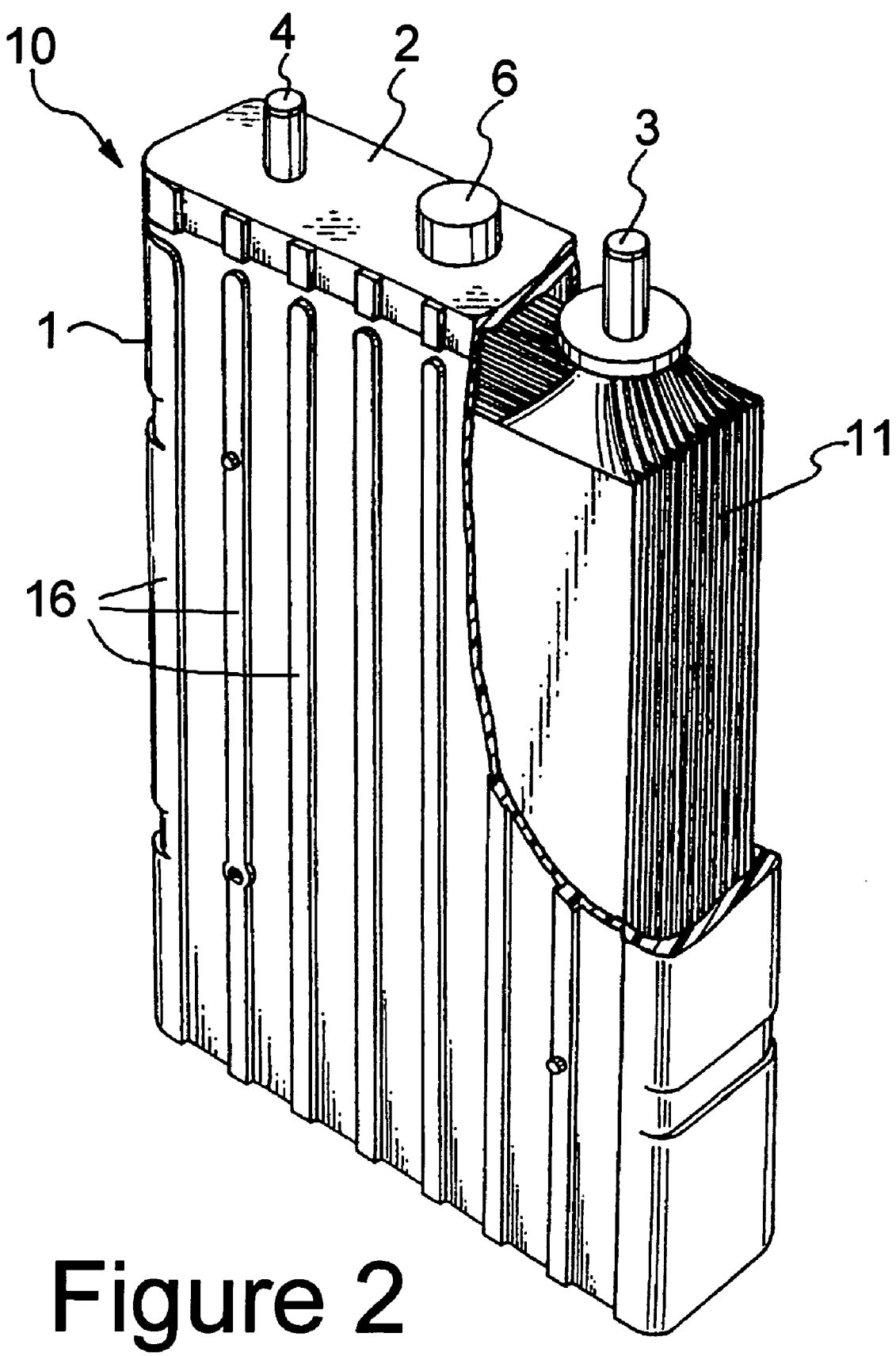
FIG. 2 depicts an embodiment of a battery of the present invention which includes a rectangular battery container formed from an enhanced thermal conductivity polymeric material.

FIG. 2 depicts an embodiment of a battery 10 of the present invention which includes a rectangular battery container 1 formed from the enhanced thermal conductivity polymeric material. The battery contains an electrode group 11 and an electrolyte. The electrode group comprises positive and negative electrode plates and separators which are piled one on another. A lid 2 of the same enhanced thermal conductivity polymeric material as that of the container 1 is welded to the upper opening of the battery container 1. The lid 2 includes a positive terminal 4 and a negative terminal 3 made of an electrically conductive material and a safety vent 6.

Figure 3:
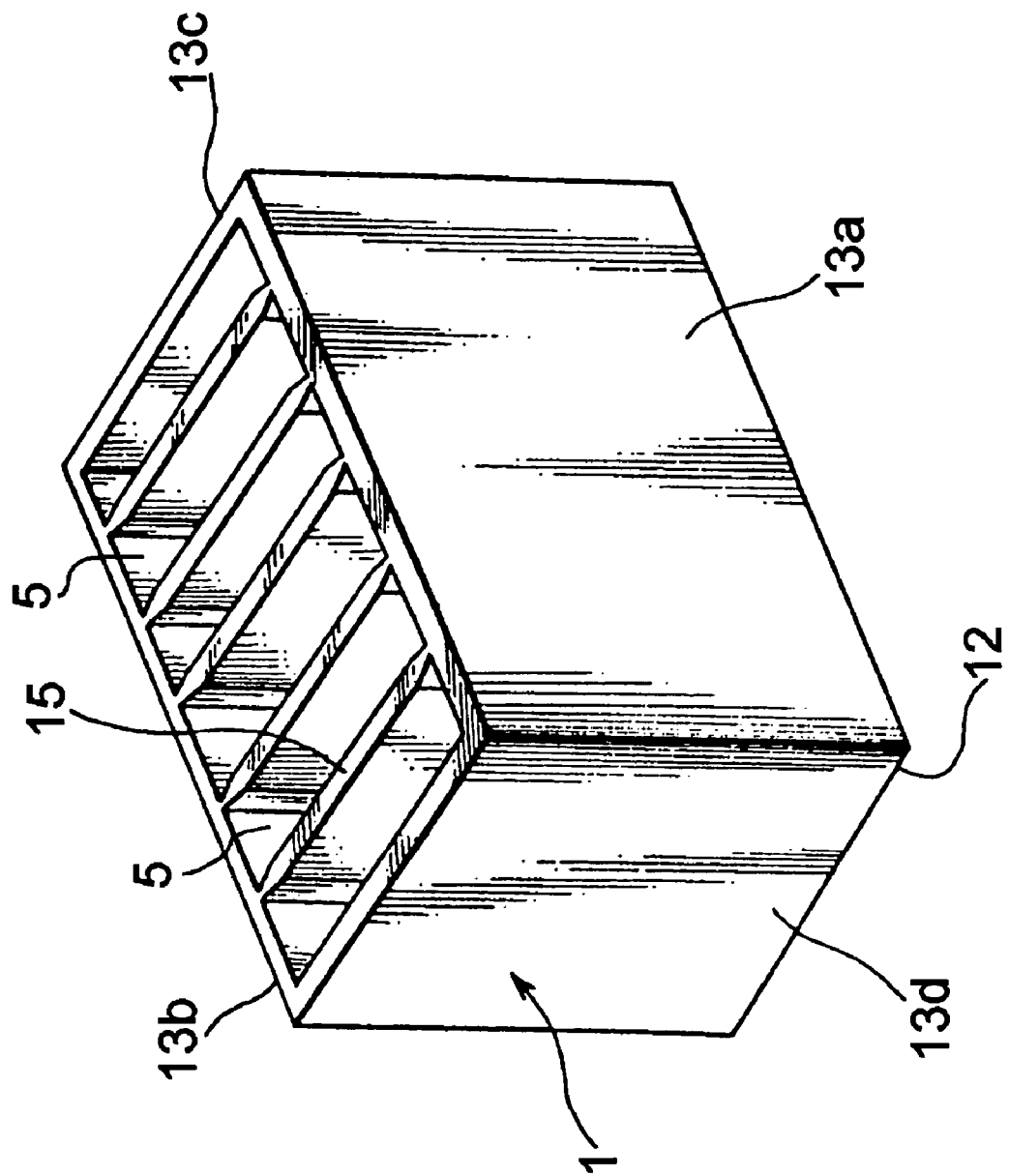
FIG. 3 is a perspective view of a mono-bock type or multi-cell module type battery case according to yet another embodiment of the present invention.
Figure 4:
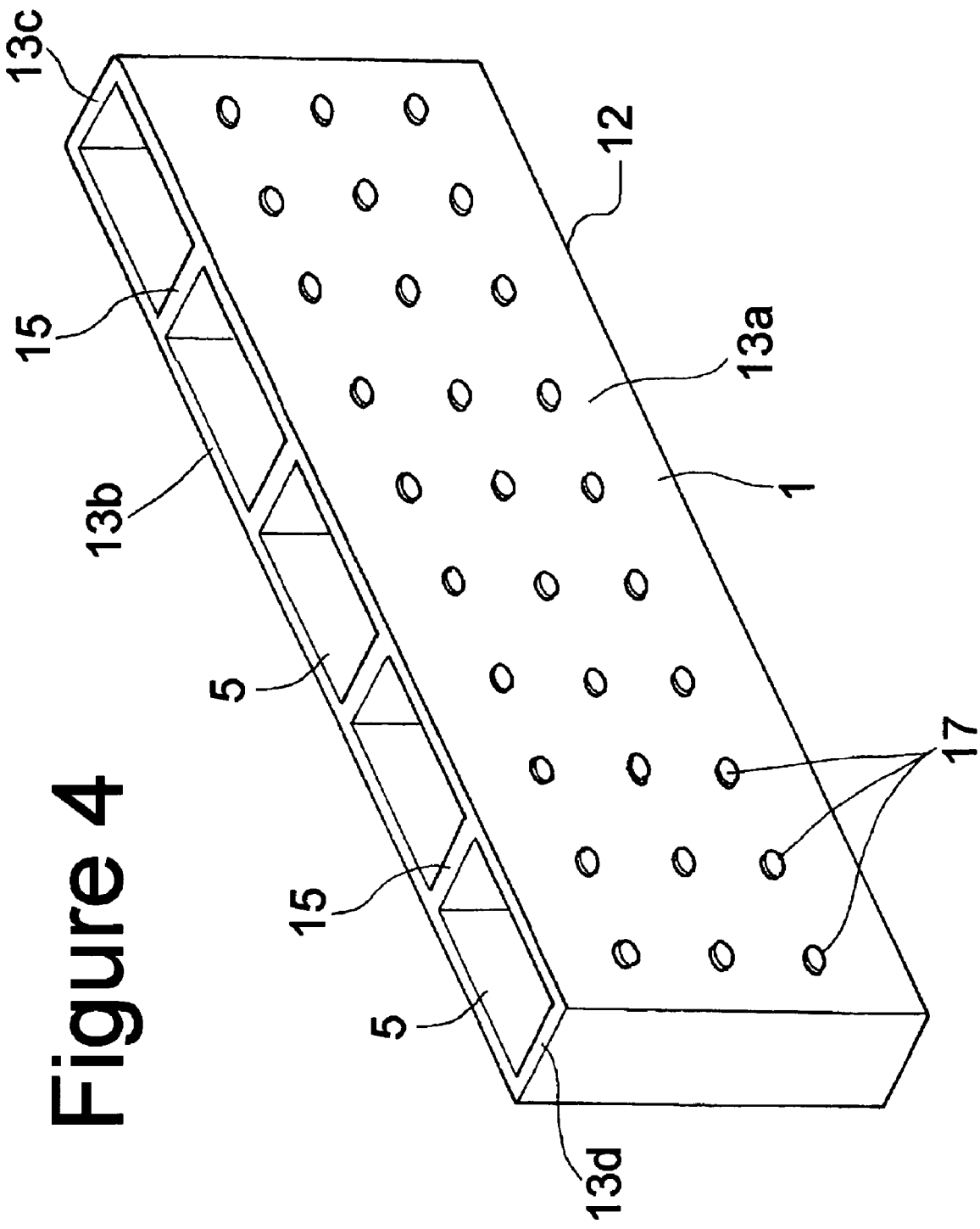
FIG. 4 is a perspective view of another mono-bock type or multi-cell module type battery case according to yet another embodiment of the present invention.

FIGS. 3 and 4 depict containers for mono-bock type or multi-cell module type batteries according to additional embodiments of the present invention. The container 1, which is formed from the enhanced thermal conductivity polymeric material, has a plurality of cell compartments 5 unified into a single case. The container 1 comprises four side walls 13a, 13b, 13c, and 13d and a bottom wall 12 (not shown) integrated together to provide a rectangular box with a top side opposite to the bottom wall 12 being open. The container 1 further comprises a plurality of partition walls 15 provided inside the container 1 to provide for cell compartments 5 into which the electrochemical cells are inserted.

Figure 5:
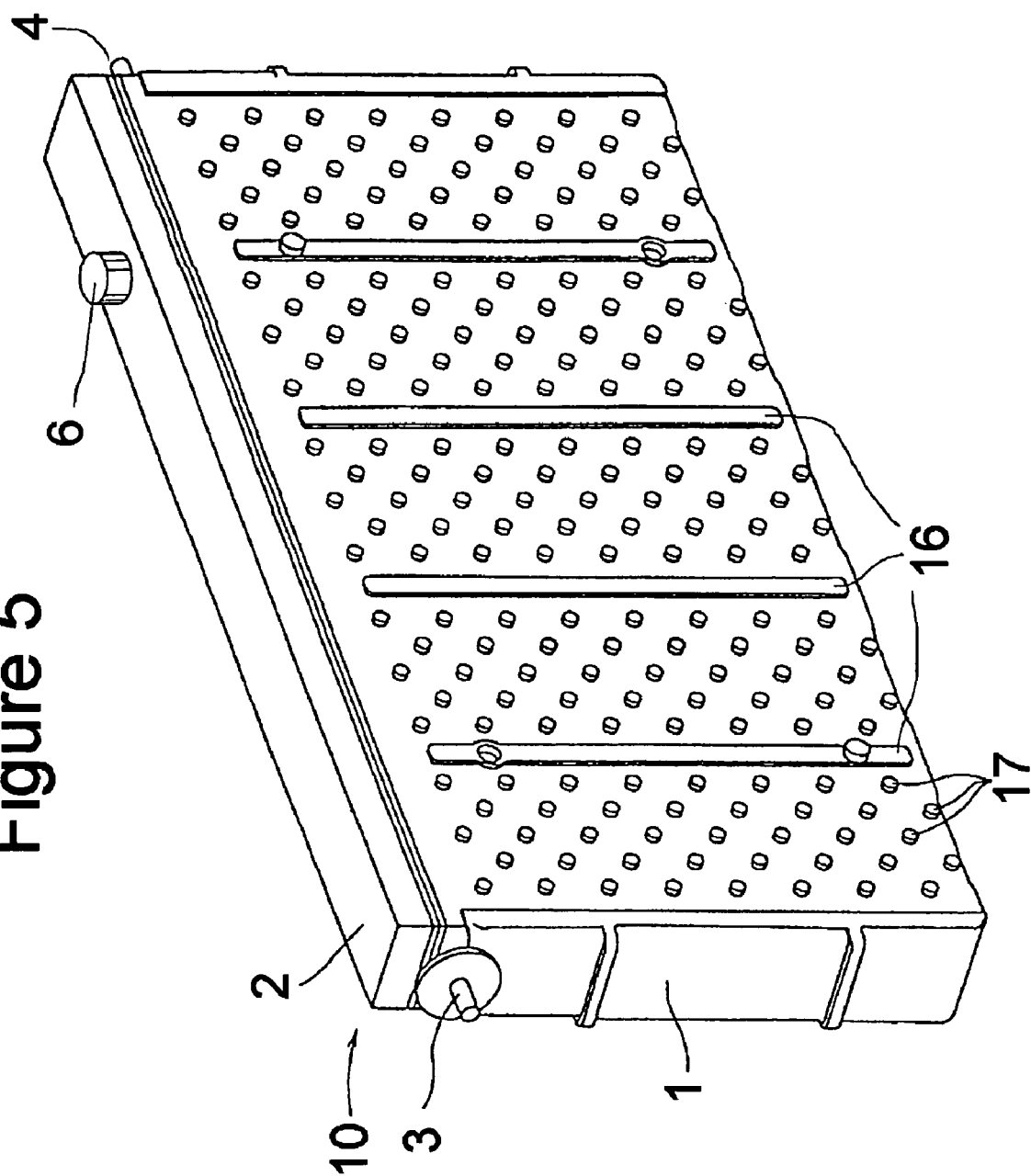
FIG. 5 depicts a mono-bock type or multi-cell module type battery according to a further embodiment of the present invention.

FIG. 5 depicts a mono-bock type or multi-cell module type battery according to a further embodiment of the present invention. The battery includes a case having a container 1 and a lid 2, which are sealed together. The battery also includes positive electrode terminal 4 and a negative electrode terminal 3. The battery further includes a safety vent 6.

Additionally, although not specifically required to practice the instant invention, the embodiments in FIGS. 2, 4 and 5 also show additional structural/thermal management features, i.e. ribs 16 and/or bosses 17.

The battery cases (meaning the combination of container 1 and lid 2) of the batteries are formed from a mixture including a matrix material and a thermally conductive, electrically insulating material distributed throughout the matrix material. The matrix material can be any of plastics, polymers, resins or combinations thereof. The thermally conductive material should have a thermal conductivity at least one order of magnitude higher than the thermal conductivity of the matrix material.

The polymer matrix material may be any of the known materials for forming plastic battery cases, and specifically may include at least one polymer selected from the group consisting of polycarbonate, polyethylene, polypropylene, acrylics, vinyls, fluorocarbons, polyamides, polyolefin. polyesters, polyphenylene sulfide, polyphenylene ether, polyphenylene oxide, polystyrene, acrylonitrile-butadiene-styrene, liquid crystal polymers and combinations, mixtures, alloys or copolymers thereof. Particularly preferred are a polyphenylene ether/polystyrene blend and a polypropylene/polyphenylene ether blend.

The thermally conductive, electrically insulating material may be distributed within the matrix material in a continuous, discontinuous or mixed mode manner. Examples of discontinuous distributions include particulate or fibrous material. Examples of a continuous distribution include two or three dimensional meshes or mattes.

Examples of suitable thermally conductive, electrically insulating material include calcium oxide, titanium oxide, silicon oxide, zinc oxide, silicon nitride, aluminum nitride, and boron nitride and mixtures thereof. Particularly preferred is particulate boron nitride. The purpose of the thermally conductive, electrically insulating material is to increase the overall thermal conductivity of the mixture used to form the battery cases. Thus the thermally conductive, electrically insulating material must be included in a sufficient amount to accomplish this task. On the other hand, too much of the additive will degrade the important physical properties required for producing a useful battery case. Preferably the mixture has a thermal conductivity at least twice that of the matrix material. More preferably the mixture has a thermal conductivity at least five times that of the matrix material, and most preferably the mixture has a thermal conductivity at least ten times that of the matrix material.

The mixture may further include a reinforcing material to strengthen the polymer matrix. The reinforcing material preferably is in the form of fibers and is made of at least one of glass, and inorganic minerals.

Generally, the electrolyte used in the batteries of the present invention may be any aqueous or non-aqueous electrolyte. An example of a non-aqueous electrochemical cell is a lithium-ion cell which uses intercalation compounds for both anode and cathode and a liquid organic or polymer electrolyte. Aqueous electrochemical cells may be classified as either "acidic" or "alkaline". An example of an acidic electrochemical cell is a lead-acid cell which uses lead dioxide as the active material of the positive electrode and metallic lead, in a high-surface area porous structure, as the negative active material. Preferably, the electrochemical cell of the present invention is an alkaline electrochemical cell.

The alkaline electrolyte may be an aqueous solution of an alkali hydroxide. Preferably, the alkaline electrolyte includes an aqueous solution of potassium hydroxide, sodium hydroxide, lithium hydroxide or mixtures of one or more thereof. The alkaline electrolyte may be a mixed hydroxide of potassium and lithium hydroxide.

The separator maybe any of those known in the art such as porous polymer sheets etc. The separator may also be combined with the electrolyte as is also known in the art. That is, the electrolyte may be a gelled electrolyte and as such may serve both as the separator and electrolyte in one single component. The separator, in combination with the electrolyte must provide the cell with ionic conductivity between the positive and negative electrodes as well as electrical resistance there between.

Generally, the positive and negative active materials used in the batteries of the present invention may be any type of active battery materials used in the art. Examples of positive electrode materials are powders of lead oxide, lithium cobalt dioxide, lithium nickel dioxide, lithium manganese oxide compounds, lithium vanadium oxide compounds, lithium iron oxide, lithium compounds, i.e., complex oxides of these compounds and transition metal oxides, manganese dioxide, zinc oxide, nickel oxide, nickel hydroxide, manganese hydroxide, copper oxide, molybdenum oxide, carbon fluoride, etc. Preferably, the positive active material is a nickel hydroxide material. Examples of negative electrode materials include metallic lithium and like alkali metals, alloys thereof, alkali metal absorbing carbon materials, zinc, cadmium hydroxide, hydrogen absorbing alloys, etc. Preferably, the active negative electrode material is a hydrogen absorbing alloy. It is within the spirit and intent of this invention that any hydrogen absorbing alloy can be used. Hence, in a preferable embodiment of the present invention, each electrochemical cell is a nickel-metal hydride cell comprising negative electrodes including hydrogen storage materials as the active material, and positive electrodes including nickel hydroxide active material.

While the invention has been described in connection with preferred embodiments and procedures, it was to be understood that it was not intended to limit the invention to the described embodiments and procedures. On the contrary, it was intended to cover all alternatives, modifications and equivalence may be included within the spirit and scope of the invention as defined by the claims appended herein and after.

We claim:

1. A battery comprising:
   at least one group of electric power-generating elements each comprising at least a positive electrode, a negative electrode and a separator; and
   a battery case containing said group of electric power-generating elements; said battery case formed from a mixture including a matrix material selected from the group consisting of plastics, polymers, resins and combinations thereof;
   wherein said mixture further includes a thermally conductive, electrically insulating material distributed throughout the matrix material, and said thermally conductive material has a thermal conductivity at least one order of magnitude higher than the thermal conductivity of the matrix material and said mixture has a thermal conductivity at least twice that of said matrix material.

2. The battery of claim 1, wherein said matrix material includes at least one polymer selected from the group consisting of polycarbonate, polyethylene, polypropylene, vinyls, polyamides, polyolefin, polyesters, polyphenylene sulfide, polyphenylene ether, polyphenylene oxide, polystyrene, acrylonitrile-butadiene-styrene, liquid crystal polymers and combinations, mixtures, alloys and copolymers thereof.

3. The battery of claim 2, wherein said at least one polymer is a polyphenylene ether and polystyrene blend.

4. The battery of claim 2, wherein said at least one polymer is a polypropylene and polyphenylene ether.

5. The battery of claim 1, wherein said thermally conductive, electrically insulating material is distributed within the matrix material in a discontinuous manner.

6. The battery of claim 5, wherein said thermally conductive, electrically insulating material is a particulate or fibrous material.

7. The battery of claim 1, wherein said thermally conductive, electrically insulating material is distributed within the matrix material in a continuous manner.

8. The battery of claim 7, wherein said thermally conductive, electrically insulating material is a two or three dimensional mesh or matte.

9. The battery of claim 1, wherein said thermally conductive, electrically insulating material includes at least one material selected from the group consisting of calcium oxide, titanium oxide, silicon oxide, zinc oxide, silicon nitride, aluminum nitride, and boron nitride.

10. The battery of claim 9, wherein said thermally conductive, electrically insulating material is particulate boron nitride.

11. The battery of claim 1, wherein said mixture further including a reinforcing material to strengthen the polymer matrix.

12. The battery of claim 11, wherein said reinforcing material is in the form of fibers.

13. The battery of claim 11, wherein said reinforcing material includes at least one of glass, and inorganic minerals.

14. The battery of claim 11, wherein said reinforcing material is glass fibers.

15. The battery of claim 1, where said mixture has a thermal conductivity at least five times that of the matrix material.

16. The battery of claim 15, where said mixture has a thermal conductivity at least ten times that of the matrix material.

* * * * *